United States Patent
Kim et al.

(10) Patent No.: US 10,613,782 B2
(45) Date of Patent: Apr. 7, 2020

(54) DATA STORAGE SYSTEM, DATA STORAGE METHOD OF THE DATA STORAGE SYSTEM, AND METHOD OF MANUFACTURING SOLID-STATE

(71) Applicant: SAMSUNG ELECTRONICS CO., LTD., Suwon-si, Gyeonggi-Do (KR)

(72) Inventors: Min Uk Kim, Incheon (KR); In Su Choi, Suwon-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 182 days.

(21) Appl. No.: 15/944,858

(22) Filed: Apr. 4, 2018

(65) Prior Publication Data

US 2019/0034107 A1    Jan. 31, 2019

(30) Foreign Application Priority Data

Jul. 31, 2017    (KR) .......................... 10-2017-0097088

(51) Int. Cl.
| | | |
|---|---|---|
| *G06F 11/00* | (2006.01) | |
| *G06F 3/06* | (2006.01) | |
| *G06F 11/14* | (2006.01) | |
| *G06F 11/07* | (2006.01) | |

(52) U.S. Cl.
CPC .......... *G06F 3/0635* (2013.01); *G06F 3/0619* (2013.01); *G06F 3/0683* (2013.01); *G06F 11/1441* (2013.01); *G06F 11/1471* (2013.01); *G06F 11/0727* (2013.01); *G06F 11/0757* (2013.01); *G06F 2201/81* (2013.01); *G06F 2201/82* (2013.01); *G06F 2201/83* (2013.01)

(58) Field of Classification Search
CPC combination set(s) only.
See application file for complete search history.

(56) References Cited

U.S. PATENT DOCUMENTS

| | | | |
|---|---|---|---|
| 8,631,284 B2 | 1/2014 | Stevens | |
| 9,830,257 B1 * | 11/2017 | Booth | ................. G06F 12/0246 |
| 10,114,691 B2 * | 10/2018 | Johri | ..................... G06F 3/0635 |
| 2004/0078623 A1 * | 4/2004 | Totolos, Jr. | ......... G06F 11/1441 |
| | | | 714/6.2 |
| 2005/0149645 A1 * | 7/2005 | Tsuruta | ................... G06F 13/28 |
| | | | 710/22 |
| 2005/0210191 A1 * | 9/2005 | Kobayashi | ............ G06F 3/0625 |
| | | | 711/114 |

(Continued)

*Primary Examiner* — Amine Riad
(74) *Attorney, Agent, or Firm* — F. Chau & Associates, LLC

(57) ABSTRACT

A data storage system includes: a storage device having a first storage and a physically separate second storage. A first core includes first data information related to first data to be written to the first storage, and a second core includes second data information related to second data to be written to the second storage. A shared memory is accessible by the first and second cores, and an emergency power system supplies backup power to the first and second cores when external power supplied to the data storage system is less than a minimum threshold operating power. When a write operation error of the second core is detected in a first mode, the first core writes the second data information to the first storage as third data information and writes the second data to the first storage as third data by referring to the second data information.

20 Claims, 19 Drawing Sheets

(56) References Cited

U.S. PATENT DOCUMENTS

| | | | |
|---|---|---|---|
| 2010/0313068 A1* | 12/2010 | Watanabe | G06F 11/2069 |
| | | | 714/6.12 |
| 2011/0252201 A1* | 10/2011 | Koren | G06F 11/1448 |
| | | | 711/135 |
| 2014/0310574 A1* | 10/2014 | Yu | G06F 11/1072 |
| | | | 714/773 |
| 2015/0138884 A1* | 5/2015 | Park | G06F 13/16 |
| | | | 365/185.08 |
| 2016/0118121 A1* | 4/2016 | Kelly | G06F 13/4068 |
| | | | 710/301 |
| 2017/0262344 A1* | 9/2017 | Shaw | G06F 11/1441 |
| 2017/0337102 A1* | 11/2017 | Engler | G06F 12/00 |
| 2018/0314666 A1* | 11/2018 | Tanaka | G06F 13/4022 |
| 2018/0373441 A1* | 12/2018 | Nassi | G06F 3/067 |
| 2019/0235779 A1* | 8/2019 | Li | G06F 3/0658 |
| 2019/0324859 A1* | 10/2019 | Armstrong | G11C 16/30 |

* cited by examiner

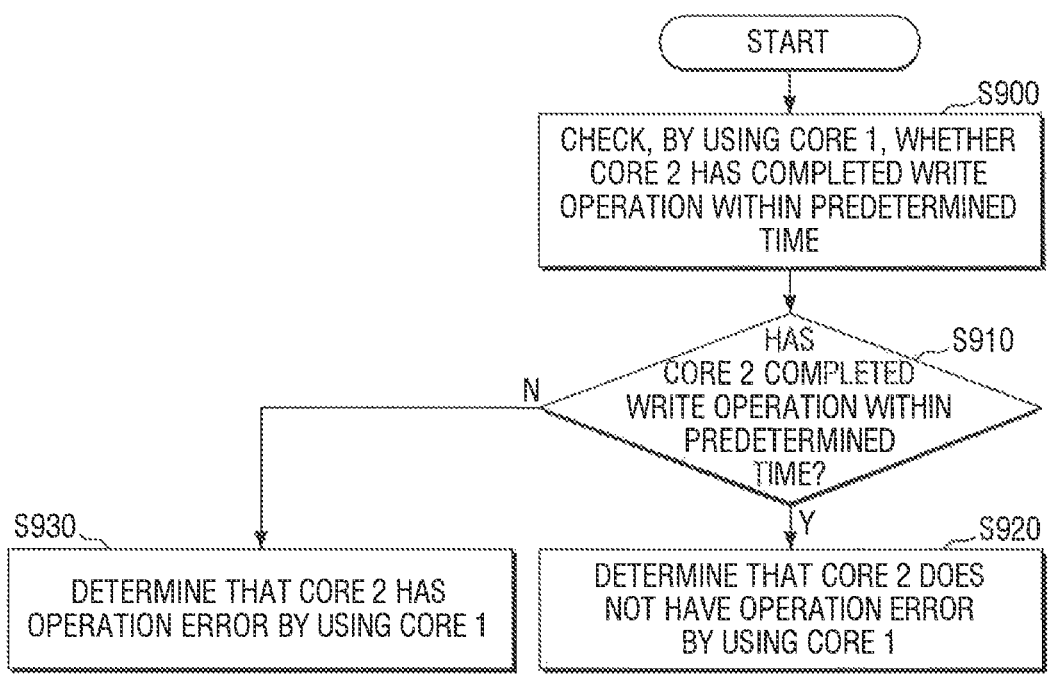

FIG. 10B
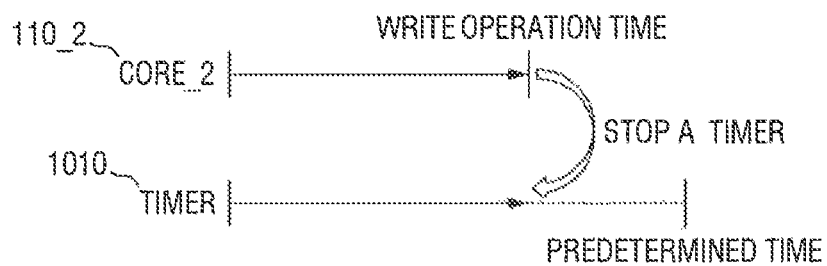
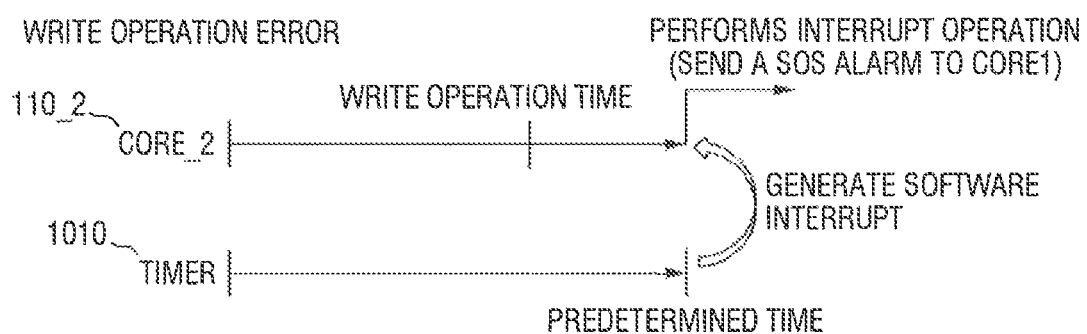

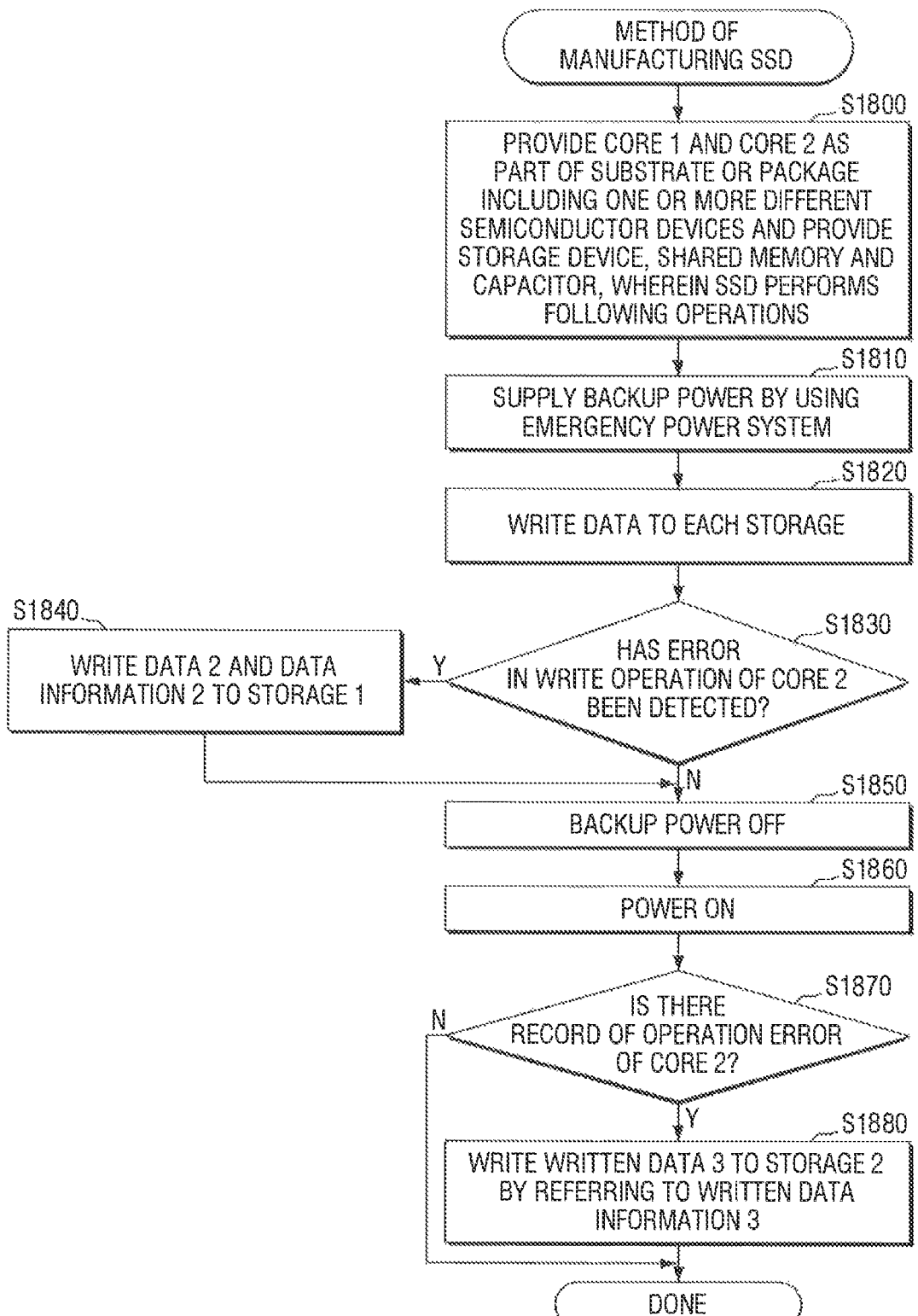

DATA STORAGE SYSTEM, DATA STORAGE METHOD OF THE DATA STORAGE SYSTEM, AND METHOD OF MANUFACTURING SOLID-STATE

This application claims the benefit of priority from Korean Patent Application No. 10-2017-0097088, filed on Jul. 31, 2017, in the Korean Intellectual Property Office, the disclosure of which is incorporated by reference herein.

1. TECHNICAL FIELD

The present inventive concept relates to a data storage system, a data storage method of the data storage system, and a method of manufacturing a solid-state drive (SSD).

2. DISCUSSION OF THE RELATED ART

A volatile memory is a relatively fast form of storage, but data stored in the volatile memory cannot be retained when the power to the memory is turned off. On the other hand, a nonvolatile memory can retain data permanently or semi-permanently, but is relatively slow.

Therefore, a data storage system using a volatile memory as a buffer may be used because of its speed of operation. For example, during an operation, data may be temporarily stored in a buffer implemented as a volatile memory so that the buffer does not cause a noticeable slowing of the speed of operation. Then, the data existing in the buffer may be flushed to a nonvolatile memory at a predetermined operating cycle. However, when the power is suddenly turned off/cut off due to an external factor, for example, when a power failure occurs, the data existing in the buffer can be lost. To prevent this problem, power loss protection (PLP) may be applied.

If the PLP is applied, when a power loss occurs, backup power is supplied, and a buffer flush operation is performed to forcibly move the data in the buffer to the nonvolatile memory. However, even if the PLP is applied, the buffer flush operation may not be performed properly due to the abnormal operation of internal components. In this case, the data existing in the buffer can be lost.

SUMMARY

Aspects of the inventive concept provide a data storage system capable of reliably storing data, even when a primary source of power is terminated unexpectedly. For example, in a case where the power supplied to the data storage system falls below a predetermined level and a first core fails to perform a write operation, a second core writes data that should have been written by the first core.

Aspects of the inventive concept also provide a data storage system in a case where a second core writes data that should have been written by a first core, the first core rewrites the data in a next power cycle to recover the data.

Aspects of the inventive concept also provide a method of manufacturing a solid-state drive (SSD) which prevents data loss.

However, aspects of the inventive concept are not restricted to the one set forth herein. The above and other aspects of the inventive concept will become better appreciated by a person of ordinary skill in the art to which the inventive concept pertains by referencing the detailed description of the inventive concept given below.

According to an aspect of the inventive concept, there is provided a data storage system including: a storage device which comprises a first storage and a second storage physically separated from the first storage; a first core having first data information related to first data to be written to the first storage; a second core having second data information related to second data to be written to the second storage; a shared memory which is accessible by the first and second cores; and an emergency power system (e.g. source) which supplies backup power to the first and second cores in a first mode in which external power supplied to the data storage system is less than minimum operating threshold power of the data storage system, wherein when a write operation error of the second core is detected in the first mode, the first core writes the second data information to the first storage as third data information and writes the second data to the first storage as third data by referring to the second data information.

According to another aspect of the inventive concept, there is provided a data storage system including: a storage device having a first storage and a second storage physically separated from the first storage; a first core which includes first data information related to first data to be written to the first storage; a second core which includes second data information related to second data to be written to the second storage; and a shared memory which is accessible by the first and second cores, wherein when a record of a write operation error of the second core is detected, the second core writes third data, which is different from the first data and has been written to the first storage, to the second storage by referring to third data information which is different from the first data information and has been written to the first storage.

According to another aspect of the inventive concept, there is provided a data storage method including: supplying pre-stored backup power to a first core and a second core in a first mode in which external power supplied to a data storage system is less than minimum operating threshold power of the data storage system; accessing a shared memory by using the first and second cores; writing, by using the first core, first data existing in the shared memory to a first storage included in a storage device by referring to first data information included in the first core; and writing, by using the second core, second data existing in the shared memory to a second storage included in the storage device and different from the first storage by referring to second data information included in the second core, wherein when a write operation error of the second core is detected, the first core writes the second data information to the first storage as third data information and writes the second data to the first storage as third data by referring to the second data information.

According to another embodiment of the inventive concept, a method of manufacturing a solid state drive (SSD) includes providing a first core and a second core as part of a semiconductor package including one or more semiconductor devices; providing a shared memory in communication with the first core and the second core, and at least one storage device in connected to the shared memory; providing at least one capacitor to store backup power to the first core and the second core; wherein the SSD is configured to receive power supplied by an external power source, and when the power supplied to the SSD is less than a minimum power to drive the SSD, the capacitor supplies power to the first and second cores of the SSD, and at least one of the first core or the second core determines, after the external power is restored to at least the minimum power to drive the SSD, whether a record of an operation error occurred regarding one of the first core or the second core, and whether data was written in a region of the storage device by the other of the first core or the second core due to the operation error, and writes the data in the storage utilized by the first core or second core in which an error previously occurred.

A data recovery process may be performed prior to the writing of the data in the storage utilized by the core in which an error previously occurred,

BRIEF DESCRIPTION OF THE DRAWINGS

These and/or other aspects will become more readily appreciated from the following description of the embodiments, taken in conjunction with the accompanying drawings in which:

FIGS. 9 through 10B are flowcharts and a diagram illustrating a method of detecting a write operation error of the second core according to some example embodiments of the inventive concept.

FIG. 18 is a flowchart illustrating a method of manufacturing an SSD according to some example embodiments of the inventive concept.

DETAILED DESCRIPTION

Figure 1:
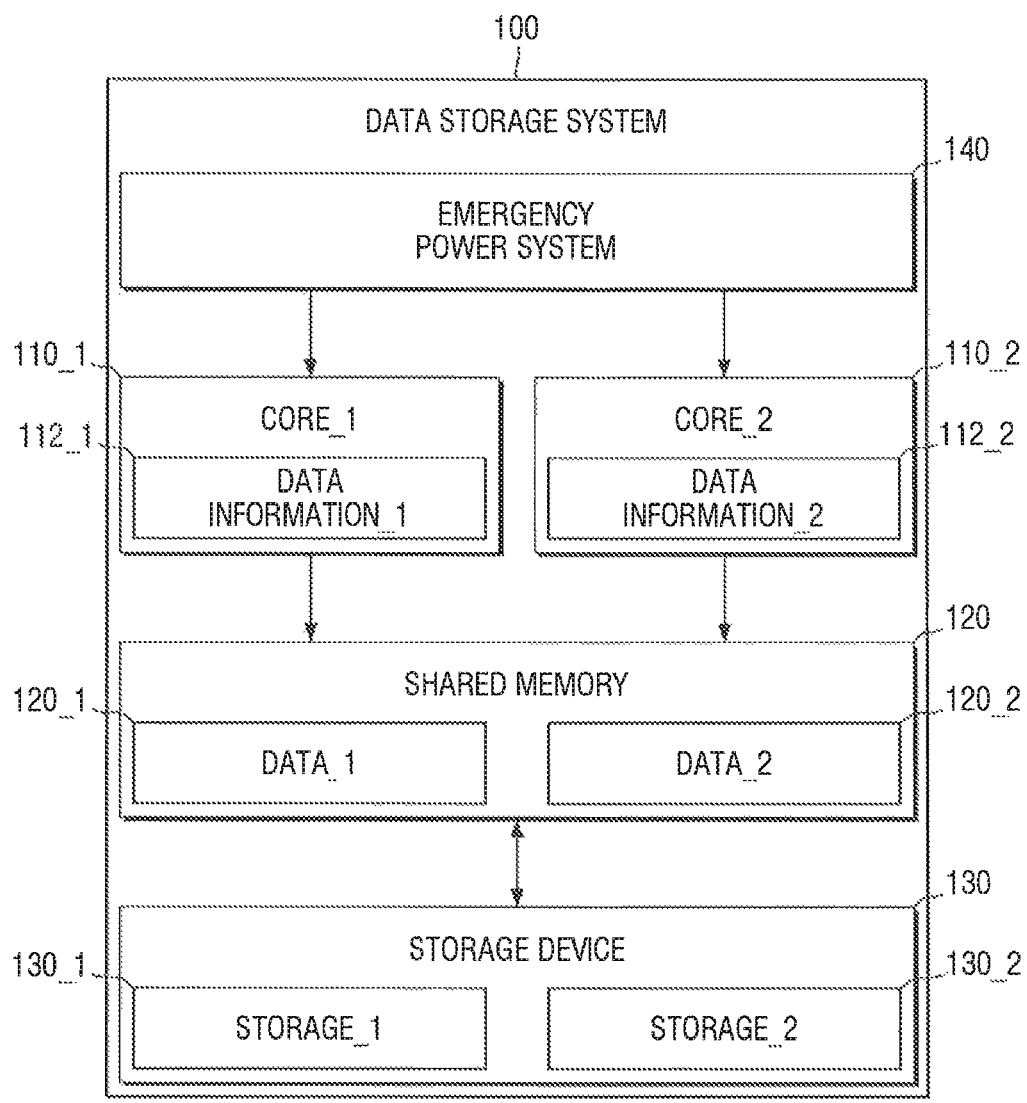
FIG. 1 is a block diagram of a data storage system according to some example embodiments of the inventive concept.

FIG. 1 is a block diagram of a data storage system 100 according to some example embodiments of the inventive concept.

Referring to FIG. 1, the data storage system 100 according to some example embodiments may include a first core 110_1, a second core 110_2, a shared memory 120, a storage device 130, and an emergency power system 140 (e.g., an emergency power source). The data storage system 100 may be, but is not limited to, for example, a solid-state drive (SSD).

According to some example embodiments of the inventive concept, when a command is input from a host, the first core 110_1 and the second core 110_2 may perform a corresponding operation. For example, the first core 110_1 and the second core 110_2 may perform a write operation in response to receiving a write command from the host. The first core 110_1 and the second core 110_2 according to some example embodiments of the inventive concept will now be described in more detail with reference to FIG. 2.

Figure 2:
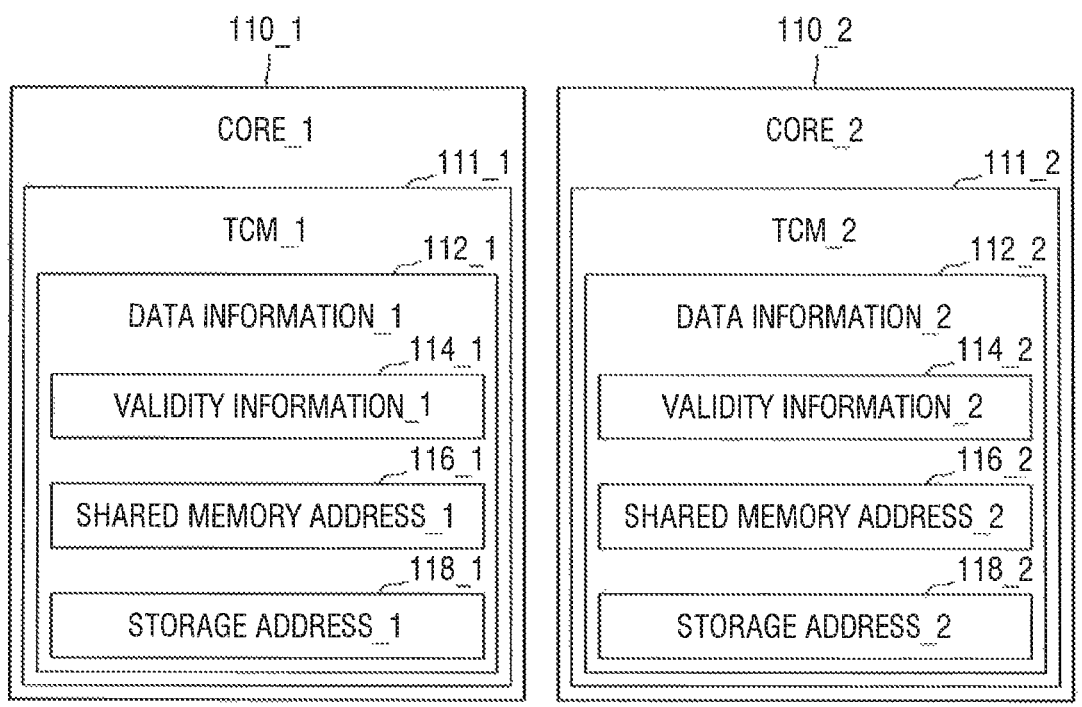
FIG. 2 is a block diagram of first and second cores and according to some example embodiments of the inventive concept.

FIG. 2 is a block diagram of first and second cores 110_1 and 110_2 according to some example embodiments.

Referring to FIGS. 1 and 2, the first core 110_1 and the second core 110_2 may have somewhat different constructions than shown. According to some example embodiments of the inventive concept, the first core 110_1 and 110_2 cannot directly access each other. In addition, the first core 110_1 may include a first tightly coupled memory (TCM) 111_1. The second core 110_2 according to some example embodiments may include a second TCM 111_2. The first TCM 111_1 and second TCM 111_2 can be accessed, for example, at every cycle.

The first TCM 111_1 and the second TCM 111_2 of the inventive concept may be used as non-sharable cache memories included in the first core 110_1 and the second core 110_2, respectively. The first TCM 111_1 and the second TCM 111_2 may include first data information 112_1 and second data information 112_2, respectively. The first TCM 111_1 and the second TCM 111_2 of the inventive concept may be implemented as, but not limited to, static random access memories (SRAMs) or faster-SRAMs, as TCMs are often used for storage of performance critical data and code, for example, interrupt handlers. The first TCM 111_1, and the second TCM 111_2, could be implemented, for example, as different memory types.

According to some example embodiments of the inventive concept, the first data information 112_1 may include content related to first data 120_1. In addition, the second data information 112_2 included in the second TCM 111_2 of the second core 110_2 may include content related to second data 120_2.

For example, with continued reference to FIG. 2, the first data information 112_1 may include first validity information 114_1 of the first data 120_1, a first shared memory address 116_1 of the first data 120_1, a first storage address 118_1 of the first data 120_1 and/or information about the type of the first data 120_1. Similarly, the second data information 112_2 may include second validity information 114_2 of the second data 120_2, a second shared memory address 116_2 of the second data 120_2, a second storage address 118_2 of the second data 120_2 and/or information about the type of the second data 120_2. However, a person of ordinary skill in the art should understand and appreciate that the first data information 112_1 and the second data information 112_2 of the inventive concept are not limited to the above example.

For example, the first validity information 114_1 and the second validity information 114_2 may include information about valid pages of a first storage 130_1 (see FIG. 1) and a second storage 130_2 to be written to, respectively. The first shared memory address 116_1 and the second shared memory address 116_2 may include an address of the first data 120_1 at the shared memory 120 and an address of the second data 120_2 at the shared memory 120, respectively. The first storage address 118_1 and the second storage address 118_2 may respectively include an address of the first storage 130_1 to which the first data 120_1 is to be written and an address of the second storage 130_2 to which the second data 120_2 is to be written.

As shown in FIGS. 1 and 2, although the data storage system 100 according to some example embodiments has two cores 110_1 and 110_2, the inventive concept is not limited to the configurations shown and discussed herein. For example, the data storage system 100 of the inventive concept may include a dual core, a quad core, a hexa core, or an octa core. However, for ease of description, it will hereinafter be assumed that the data storage system 100 of the inventive concept has two cores 110_1 and 110_2.

Referring back to FIG. 1, the shared memory 120, according to some example embodiments of the inventive concept, may be used as a buffer memory between the first and second cores 110_1 and 110_2, and the storage device 130. For example, the data to be written to the data storage system 100 according to some example embodiments may first be stored in the shared memory 120 as a buffer. The shared memory 120, may be an SSD so that the operational speed is relatively fast. The shared memory 120 according to some example embodiments will now be described in more detail with reference to FIG. 3.

Figure 3:
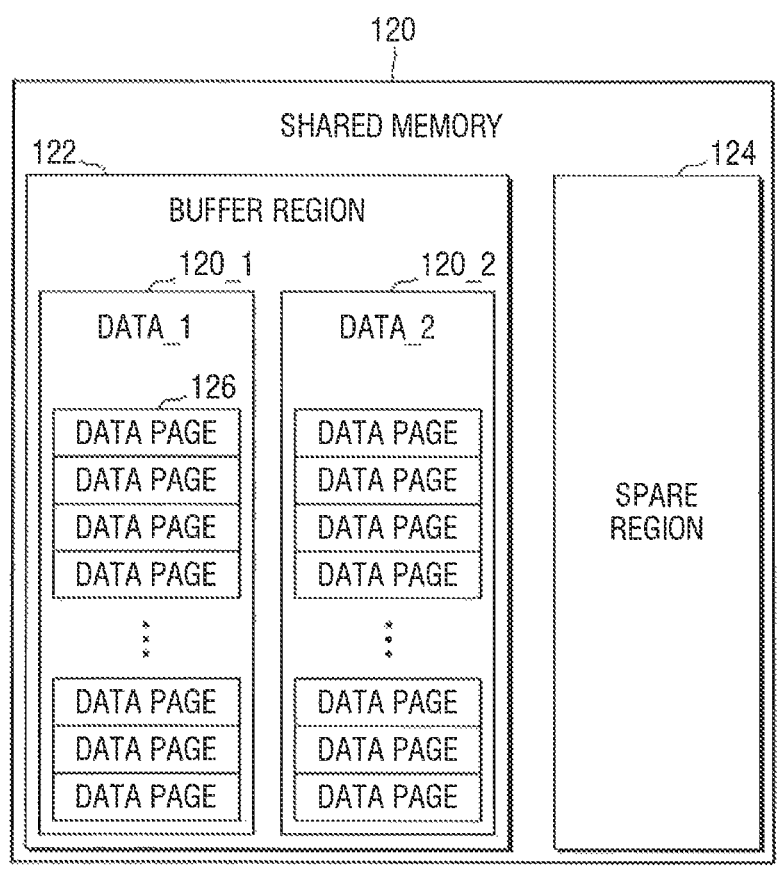
FIG. 3 is a block diagram of a shared memory according to some example embodiments of the inventive concept.

FIG. 3 is a block diagram of a shared memory 120 according to some example embodiments of the inventive concept.

Referring to FIGS. 1 and 3, the shared memory 120 according to some example embodiments of the inventive concept may include a buffer region 122 and a spare region 124. The buffer region 122 may include first data 120_1 and second data 120_2. Each of the first data 120_1 and the second data 120_2 may include a plurality of data pages 126. In other words, each of the first data 120_1 and the second data 120_2 may include a plurality of data pages 126. For example, in the present specification, each of the first data 120_1 and the second data 120_2 may be a set of a plurality of data pages 126.

The shared memory 120 according to some example embodiments may be implemented as, for example, a volatile memory. The volatile memory may be, but is not limited to, a dynamic random access memory (DRAM), an SRAM, or a double data rate synchronous DRAM (DDR SDRAM).

Referring again to FIGS. 1 and 3, both the first core 110_1 and the second core 110_2 may access the shared memory 120. Therefore, the first core 110_1 and the second core 110_2 can access, for example, the buffer region 122 and/or the spare region 124 of the shared memory 120. For example, the first core 110_1 can access the second data 120_2 in the shared memory 120 as well as the first data 120_1 in the shared memory 120. Similarly, the second core 110_2 can access the first data 120_1 in the shared memory 120 as well as the second data 120_2 in the shared memory 120. In addition, the first core 110_1 and the second core 110_2 can access the spare region 124 of the shared memory 120. Here, which region of the shared memory 120 will be accessed by each of the first core 110_1 and the second core 110_2 may be determined by the shared memory address 116_1 or 116_2 (see FIG. 2) included in the data information 112_1 or 112_2 of the first or second core 110_1 or 110_2.

Referring back to FIG. 1, the shared memory 120 may flush the first data 120_1 and the second data 120_2 stored in the shared memory 120 to the storage device 130 according to a specific signal or a specific cycle. For example, the specific signal may refer to a signal from the first core 110_1 and/or from the second core 110_2. The storage device 130 according to some example embodiments will now be described in more detail with reference to FIG. 4.

Figure 4:
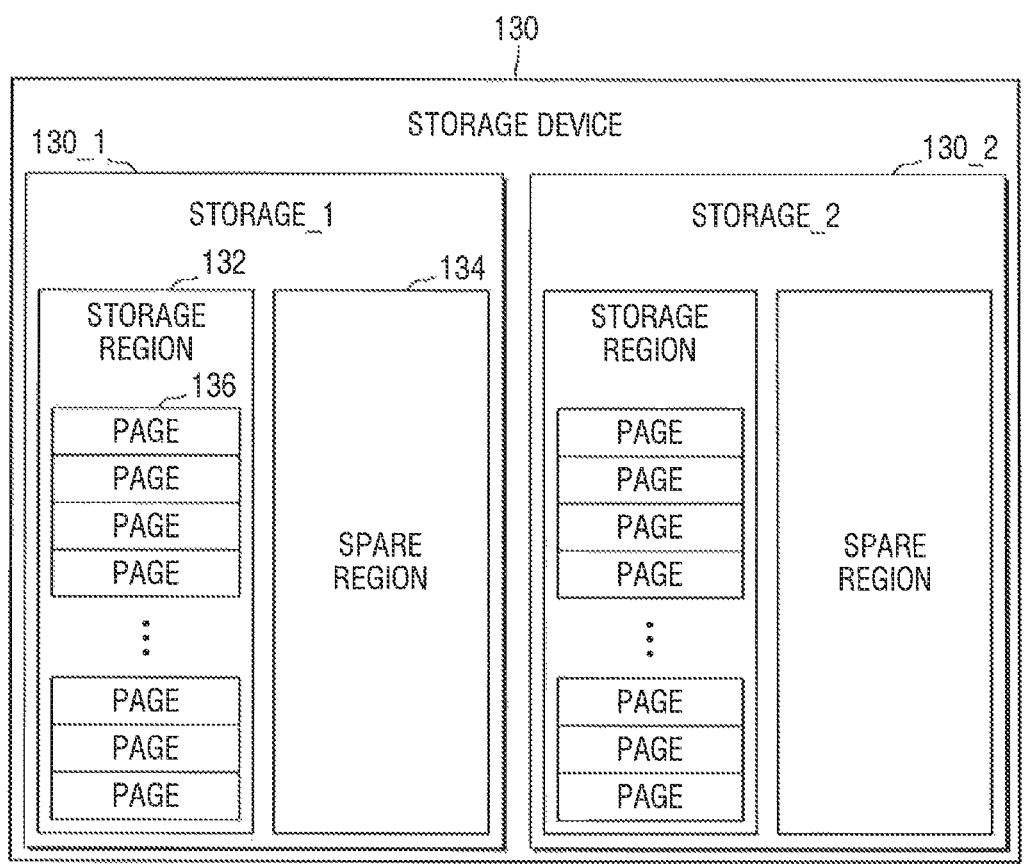
FIG. 4 is a block diagram of a storage device according to some example embodiments of the inventive concept.

FIG. 4 is a block diagram of a storage device 130 according to some example embodiments.

Referring now to FIG. 4, the storage device 130 according to some example embodiments may include a first storage 130_1 and a second storage 130_2. In the present embodiment of the inventive concept, the first storage 130_1 refers to a storage to which the first core 110_1 writes data. Likewise, the second storage 130_2 refers to a storage to which the second core 110_2 writes data. In the present embodiment of the inventive concept, each of the first storage 130_1 and the second storage 130_2 may include a plurality of memories. Also, in the present embodiment of the inventive concept, the storage device 130 does not refer to a single semiconductor device but refers to a set of storages that are capable of storing data permanently or semi-permanently.

For example, when NAND flash memories are used as the storage device 130, if the first core 110_1 can write data to four NAND flash memories, the four NAND flash memories may be referred to as the first storage 130_1 herein. Likewise, if the second core 110_2 can write data to four NAND flash memories different from the first storage 130_1, the four NAND flash memories may be referred to as the second storage 130_2 herein. In the present embodiment of the inventive concept, a set of the first storage 130_1 and the second storage 130_2 is referred to as the storage device 130 for the sake of convenience.

With continued reference to FIG. 4, the first storage 130_1 may include a storage region 132_1 and a spare region 134_1. The second storage 130_2 may include storage region 132_2 and spare region 134_2. Each of the first storage region 130_1 and second storage region 130_2 may include a plurality of pages 136. Each of the spare regions 134_1 and 134_2 may be, for example, a region for overprovisioning. The amount of capacity and application class of the respective spare regions can vary, with a larger allotment for a write-intensive application class versus a read-intensive application class. Although one storage region and one spare region are provided in each storage in FIG. 4, the inventive concept is not limited to this embodiment shown and discussed herein above. For example, when the first storage 130_1 includes four NAND flash memories, each having a storage region and an overprovisioning region, the first storage 130_1 may have four storage regions and four spare regions.

The storage device 130 according to some example embodiments may be implemented as a nonvolatile memory. For example, the storage device 130 of the inventive concept may be, but is not in any way limited to, an electrically erasable programmable read-only memory (EEPROM), a ferroelectric random access memory (FRAM), a phase-change random access memory (PRAM), a magnetic random access memory (MRAM), a resistive random access memory (RRAM), a NAND flash memory, a NOR flash memory, and/or a combination of these memories.

With reference to FIG. 1 through FIG. 4, a process in which a plurality (e.g., two or more) f cores 110_1 and 110_2 configured to write a plurality of data 120_1 and 120_2 to a plurality of storages 130_1 and 130_2 will now be described. The first core 110_1 can write the first data 120_1 to the first storage 130_1. Also, the second core 110_2 can write the second data 120_2 to the second storage 130_2. Writing the first data 120_1 and the second data 120_2 respectively to the first storage 130_1 and the second storage 130_2 may denote storing the first data 120_1 and the second data 120_2, which are temporarily stored in the shared memory 120, in the first storage 130_1 and the second storage 130_2 which are nonvolatile memories, respectively. Here, the first core 110_1 may write the first data 120_1 to the first storage 130_1 by referring to the first data information 112_1. Also, the second core 110_2 may write the second data 120_2 to the second storage 130_2 by referring to the second data information 112_2.

For example, the first core 110_1 may find the location of the first data 120_1 in the shared memory 120 by using the first shared memory address 116_1 (FIG. 2) and write the first data 120_1 to the first storage 130_1 indicated by the first storage address 118_1. Here, the first data 120_1 may include a plurality of data pages 126 (FIG. 3) and may be written to the first storage 130_1 on a page-by-page basis.

Similar to the operation of the first core 110_1 discussed herein above, the second core 110_2 may find the location of the second data 120_2 in the shared memory 120 by using the second shared memory address 116_2 and write the second data 120_2 to the second storage 130_2 indicated by the second storage address 118_2. Here, the second data 120_2 may include a plurality of data pages 126 and may be written to the second storage 130_2 on a page-by-page basis.

Referring back to FIG. 1, when power supplied from an external source to the data storage system 100 is less than the minimum power required to drive the data storage system 100, the emergency power system 140 may supply backup power to the data storage system 100 so that the data storage system remains operational. In addition, when power is supplied from the external source to the data storage system 100, the emergency power system 140 may store a portion of the power, and may subsequently output the stored portion of the power as backup power. The emergency power system 140 according to some example embodiments may be implemented as, but is not limited to, a capacitor and/or an uninterruptible power supply (UPS).

Figure 5:
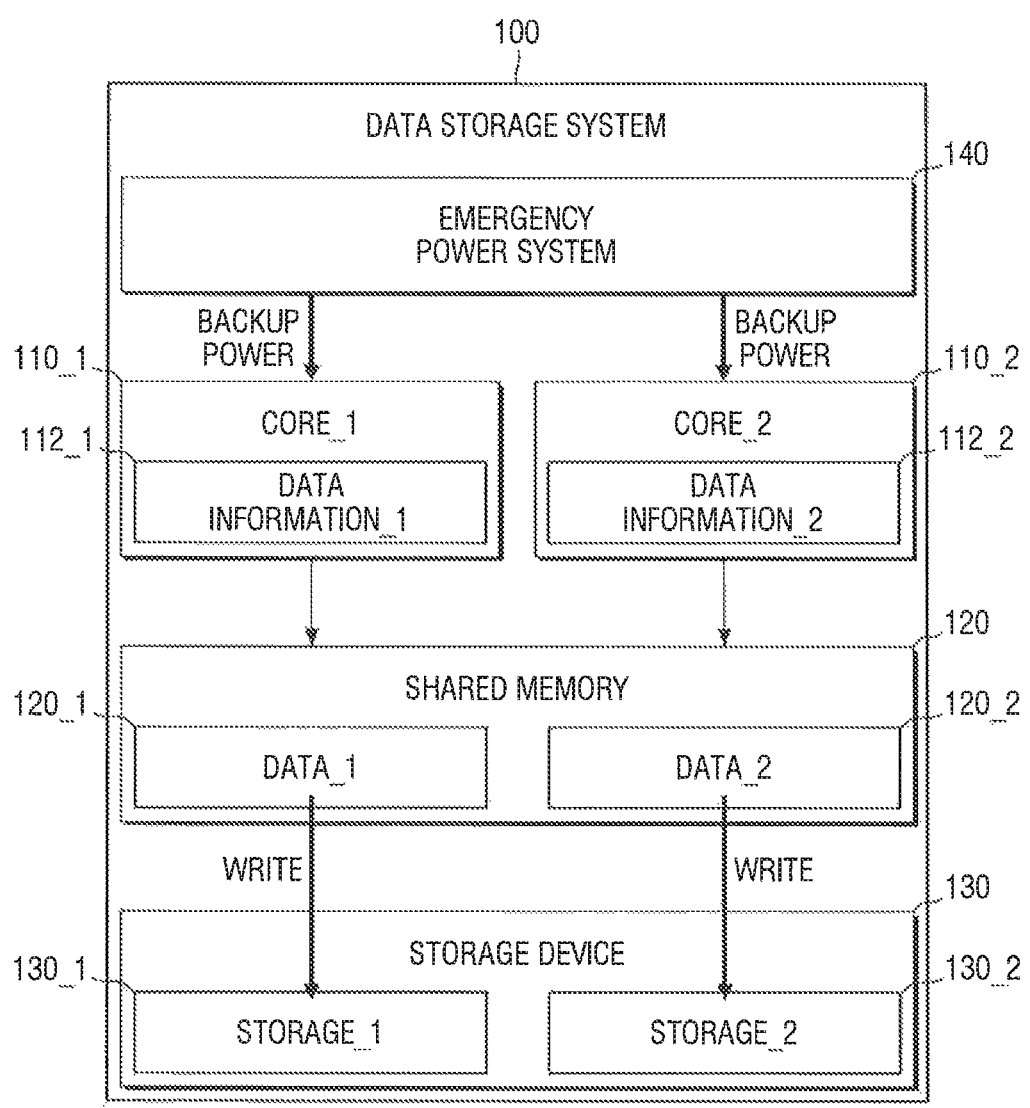
FIG. 5 is a block diagram illustrating a process in which the data storage system writes data while backup power is being supplied according to some example embodiments of the inventive concept.

FIG. 5 is a block diagram illustrating a process in which the data storage system 100 (such as shown in FIG. 1) writes data while backup power is being supplied according to some example embodiments of the inventive concept.

For ease of description, the shared memory 120 of the inventive concept will be described as a DRAM hereinafter only for illustrative purposes. However, embodiments of the inventive concept, as well as the appended claims, are not limited to the shared memory 120 being a DRAM. As apparent to a person of ordinary skill in the art, since a DRAM is a volatile memory, if power is not smoothly supplied (e.g. without interruption or relatively large variations in a voltage level supplied to the DRAM, the data included in the DRAM can be lost. Therefore, a process of writing data included in the DRAM to the storage device 130, which can be implemented as a nonvolatile memory, when power is not supplied smoothly to the DRAM will be now described with reference to FIG. 5.

Referring to FIG. 5, the data storage system 100 according to some example embodiments of the inventive concept may be driven by the power supplied from an external source. However, when the power supplied from the external source is less than the minimum power used to drive the data storage system 100 in a normal operating mode, or when the supply of the power is interrupted due to an external factor, the emergency power system 140 of the inventive concept may supply backup power to the first core 110_1 and the second core 110_2 (and also supply power to the DRAM for preventing data loss).

When the backup power is supplied to the first core 110_1 by the emergency power system 140, the first core 110_1 may forcibly write the first data 120_1 to the first storage 130_1. For example, the first core 110_1 may access the first data 120_1 in the DRAM by referring to the first shared memory address 116_1 included in the first data information 112_1. Then, the first core 110_1 may write the first data 120_1 to the first storage 130_1 by referring to the first storage address 118_1 included in the first data information 112_1.

Similarly, when the backup power is supplied to the second core 110_2 by the emergency power system 140, the second core 110_2 may forcibly write the second data 120_2 to the second storage 130_2. For example, the second core 110_2 may access the second data 120_2 in the DRAM by referring to the second shared memory address 116_2 included in the second data information 112_2. Then, the second core 110_2 may write the second data 120_2 to the second storage 130_2 by referring to the second storage address 118_2 included in the second data information 112_2.

Figure 6:
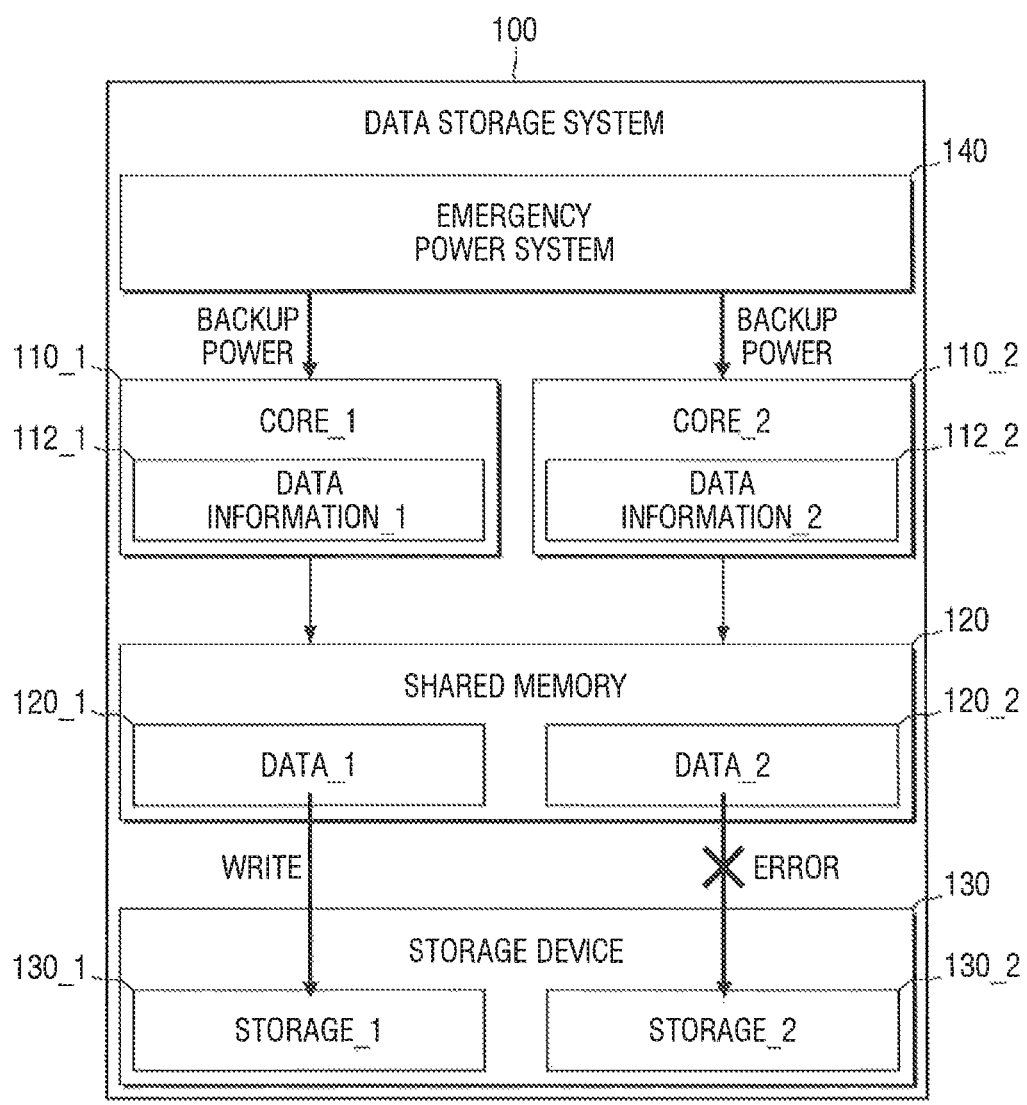
FIG. 6 is a block diagram illustrating an error in a write operation of a core according to some example embodiments of the inventive concept.

When the first core 110_1 and the second core 110_2 complete their write operation while the backup power is being supplied, the supply of the backup power stop. The supply of the backup power may unexpectedly stop, for example, by a hardware issue, or the charged stored in a capacitor of the emergency power system may become exhausted after a predetermined period of usage. Since the first data 110_1 and the second core 110_2 forcibly write the first data 120_1 and the second data 120_2 included in the DRAM to the first storage 130_1 and the second storage 130_2 implemented as nonvolatile memories, respectively, the first data 120_1 and the second data 120_2 can be reliably stored even when the power supply is interrupted. FIG. 6 is a block diagram illustrating an error in a write operation of a core according to some example embodiments of the inventive concept. More particularly, an error may occur, for example while an operation is being executed by the second core.

Referring to FIG. 6, as described above, when external power supplied to the data storage system 100 is less than the minimum power required to drive the data storage system, 100 or when the supply of the power is interrupted due to an external factor, the emergency power system 140 may supply backup power to the first core 110_1 and the second core 110_2, and the first core 110_1 and the second core 110_2 may perform a write operation.

The minimum operating threshold power may be a minimum power by which the data storage system can normally function, for example, have the plurality of cores perform write operations to a shared memory, for example a DRAM. When the external power supplied is below a minimum operating threshold power, there can be a core flush of each page stored in a TCM to DRAM, and when one of the cores fails from power loss, or for example, a write error occurs, a functioning core (one in which an error did not occur) stores data from a failing core to, nonvolatile memory. In a next power cycle, there can be a restoration of the data to the storage controlled by the core where the error occurred.

Here, when the second core 110_2 fails to store the second data 120_2 in the second storage 130_2 due to an error in its write operation, for example, in a case where the supply of the backup power is stopped, the second data 120_2 may be lost. In other words, since the second data 120_2 stored in the DRAM cannot be written to the second storage 130_2, which can be implemented as a nonvolatile memory, due to the write operation error of the second core 110_2, the second data 120_2 may disappear in the event of the interruption of the external power or the backup power.

The write operation error of the second core 110_2 may include, for example, assert, core hang, and/or abnormal operation of the second storage 130_2. For example, the write operation error of the second core 110_2 may include all cases where the second core 110_2 fails to write the second data 120_2, such as a case where the second core 110_2 fails to execute an input write command due to the core hang and a case where the second data 120_2 fails to be written to the second storage 130_2 due to an error in the second storage 130_2.

Figure 7:
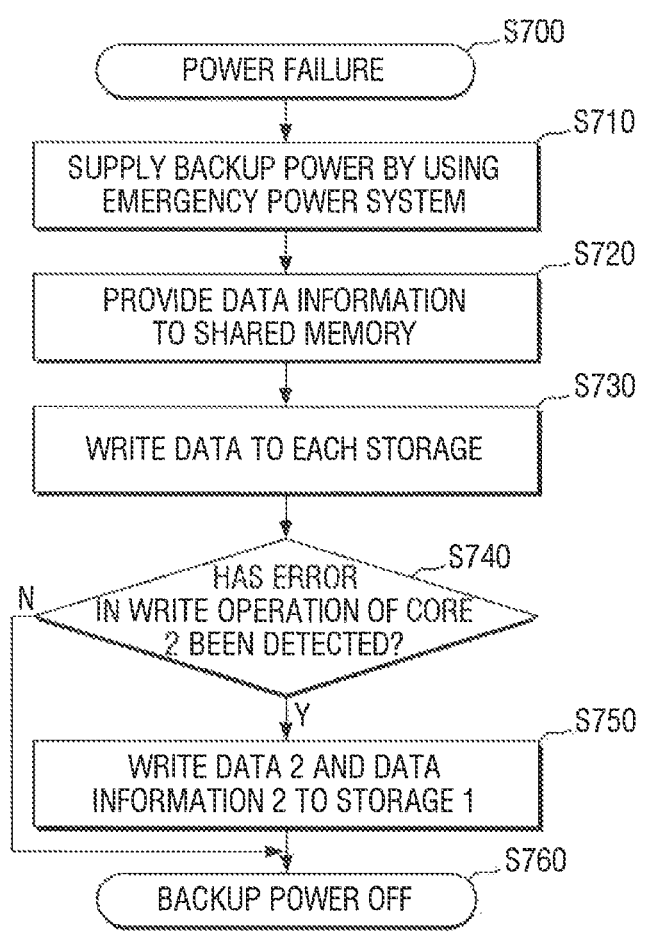
FIGS. 7 and 8 are a flowchart and a block diagram illustrating a method of writing data in a case where a core has a write operation error according to some example embodiments of the inventive concept.
Figure 8:
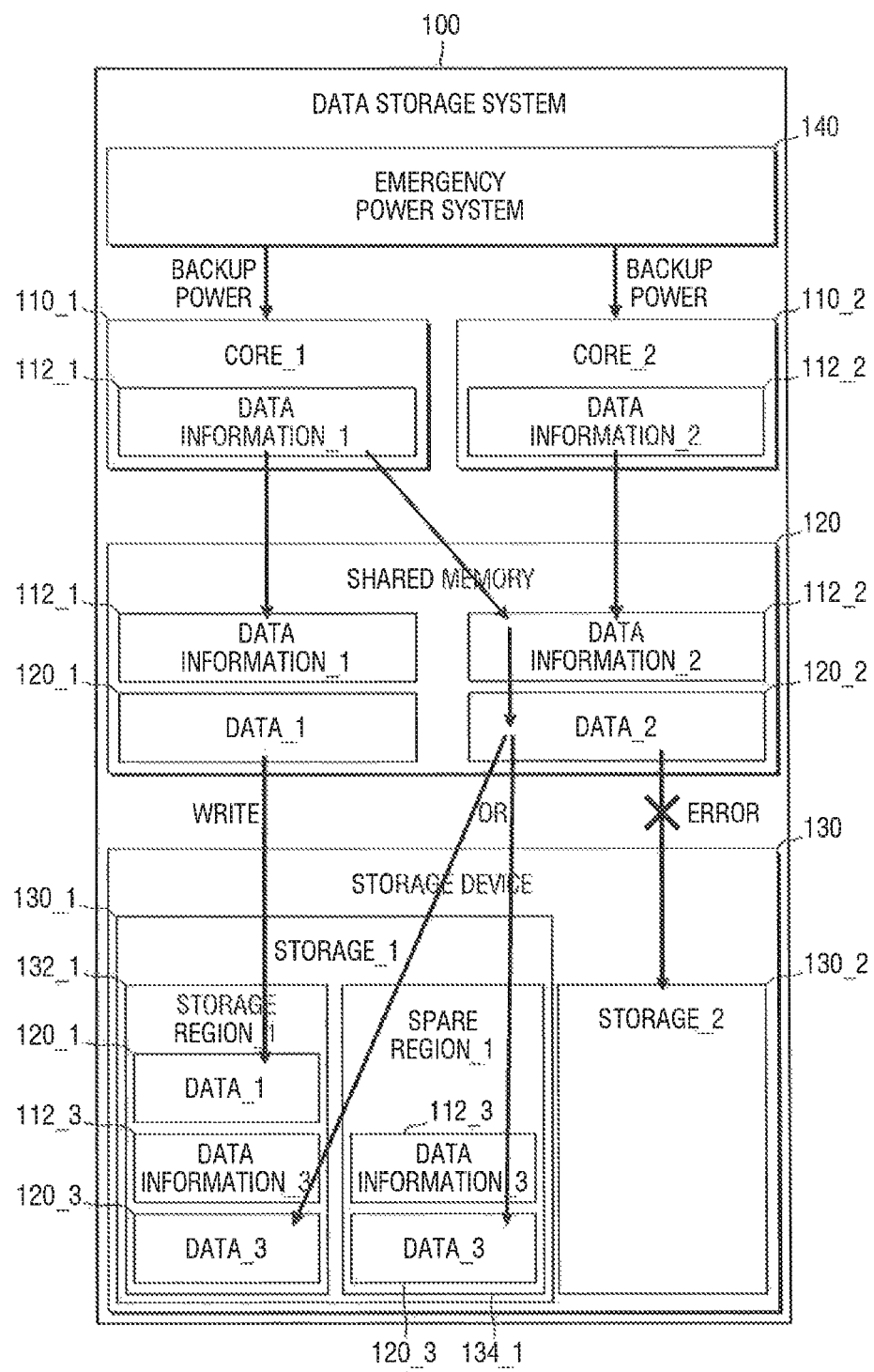

FIGS. 7 and 8 are a flowchart and a block diagram illustrating a method of writing data in a case where a core has a write operation error according to some example embodiments of the inventive concept.

For ease of description, any components and/or features substantially identical to those described above will be omitted, and the differences therebetween will be mainly described. In addition, the same reference numerals as those used above will be used for ease of description.

Referring now to FIG. 7, at operation (S700), when external power supplied to the data storage system 100 is less than the minimum power required to drive the data storage system 100, or when the supply of the external power is interrupted due to an external factor, then at operation (S710) the emergency power system 140 of the inventive concept supplies backup power.

At operation (S720), when the backup power is being supplied to the data storage system, the first core 110_1 and the second core 110_2 respectively provide the first data information 112_1 and the second data information 112_2 to the shared memory 130.

Specifically, referring to FIG. 8, in a case when the backup power is supplied to the first core 110_1, the first core 110_1 may provide the first data information 112_1 included in the first core 110_1 to the DRAM. The second core 110_2 may also provide the second data information 112_2 included in the second core 110_2 to the DRAM. Here, the first core 110_1 land the second core 110_2 may provide the first data information 112_1 included in the first core 110_1 and the second data information 112_2 included in the second core 110_2 to a part of the buffer region 122 (see FIG. 3) of the DRAM or to the spare region 124 (see FIG. 3) of the DRAM, respectively.

Consequently, since the first core 110_1 and the second core 110_2 provide the first data information 112_1 and the second data information 112_2 to the DRAM, the first core 110_1 can refer to (e.g. access) the second data information 112_2, and the second core 110_2 can refer to the first data information 112_1. In other words, since the first core 110_1 and the second core 110_2 provide the first data information 112_1 and the second data information 112_2 to the shared memory 120, the first data information 112_1 and the second data information 112_2 can be shared.

Referring back to FIG. 7, at operation (S730), the first core 110_1 and the second core 110_2 write the first data 120_1 and the second data 120_2 to the first storage 130_1 and the second storage 130_2, respectively.

Specifically, for example, referring to FIG. 8, the first core 110_1 may write the first data 120_1 to the first storage 130_1 by referring to the first data information 112_1 included in the first core 110_1 or the first data information 112_1 provided to the shared memory 120. Similarly, the second core 110_2 may write the second data 120_2 to the second storage 130_2 by referring to the second data information 112_2 included in the second core 110_2 or the second data information 112_2 provided to the shared memory 120.

Referring back to FIG. 7, at operation (S740), when the second core 110_2 has no error in its write operation, for example, when the first core 110_1 and the second core 110_2 finish writing the first data 120_1 and the second data 120_2 to the storage device 130, then the supply of the backup power is stopped operation (S760).

However, at operation (S740), if an error in the write operation of the second core 110_2 is detected, then at operation (S750) the first core 110_1 writes the second data information 112_2 and the second data 120_2 to the first storage 130_1.

More specifically, for example, referring to FIG. 8, there are various ways that, for example, the first core 110_1 may respond when the second core 110_2 fails to write the second data 120_2 to the second storage 130_2.

For example, when the first core 110_1 detects an error in the write operation of the second core 110_2, the first core 110_1 may write the second data information 112_2 to the first storage 130_1 as third data information 112_3. In other words, the second data information 112_2 may be written into an area of the first storage designated for the third data information. An additional bit, for example, a signature bit, is one way the data information may be identified as actually being the second data information 112_2 of the second core 110_2.

In addition, the first core 110_1 may write the second data 120_2 to the first storage 130_1 as third data 120_3 by referring to the second data information 112_2.

In another example, the first core 110_1 may write the second data information 112_2 and the second data 120_2 to the first storage region 132_1 of the first storage 130_1 as the third data information 112_3 and the third data 120_3, respectively.

In yet another example, the first core 110_1 may write the second data information 112_2 and the second data 120_2 to the first spare region 134_1 of the first storage 130_1 as the third data information 112_3 and the third data 120_3, respectively.

In still another example, the first core 110_1 may write the second data information 112_2 to the first spare region 134_1 of the first storage 130_1, and provide a mark or indication that the stored second data information 112-2 is the third data information 112_3 and write the second data 120_2 to the first storage region 132_1 of the first storage 130_1 as the third data 120_3.

When the first core 110_1 writes the second data information 112_2 and the second data 120_2 to the first storage 130_1 as the third data information 112_3 and the third data 120_3, it may also write one signature bit indicating the second data information 112_2 and another signature bit indicating the second data 120_2, so that the signature bits can be used in a data recovery process.

For example, the third data information 112_3 may include the second data information 112_2 and the signature bit of the second data information 112_2. Likewise, the third data 120_3 may include the second data 120_2 and the signature bit of the second data 120_2. However, the inventive concept is not limited to this case. For example, the third data information 112_3 may be the same as the second data information 112_2, and the third data 120_3 may be the same as the second data 120_2.

For example, the first core 110_1 may write the second data 120_2, the signature bit of the second data 120_2, the second data information 112_2, and the signature bit of the second data information 112_2 to the first storage region 132_1 of the first storage 130_1.

Alternatively, for example, the first core 110_1 may write the second data 120_2, the signature bit of the second data 120_2, the second data information 112_2, and the signature bit of the second data information 112_2 to the first spare region 134_1 of the first storage 130_1.

In another example, the first core 110_1 may write the second data 120_2 and the signature bit of the second data 120_2 to the first storage region 132_1 of the first storage 130_1 and write the second data information 112_2 and the signature bit of the second data information 112_2 to the first spare region 134_1 of the first storage 130_1. Thus, the second data (DATA2) is written to one region (e.g., the first storage region 132_1), while the second data information (Data Information 2) may be written to the first spare region (e.g. 134_1).

For example, the signature bit of the second data 120_2 may be a bit indicating that the second data 120_2 is related to the second core 110_2, a bit indicating that the second data 120_2 is data to be written to the second storage 130_2, or a combination of these bits. Also, the signature bit of the second data information 112_2 may be a bit indicating that the second data 120_2 is related to the second core 110_2, a bit indicating that the second data information 112_2 is information related to data to be written to the second storage 130_2, or a combination of these bits.

Referring back to FIG. 7, when the first core 110_1 finishes writing the second data information 112_2 and the second data 120_2 to the first storage 130_1, the supply of the backup power is stopped (operation S760).

In summary, when backup power is supplied, the first core 110_1 and the second core 110_2 may respectively provide the first data information 112_1 and the second data information 112_2 to the shared memory 120. At this time, if an error in the write operation of the second core 110_2 is detected, the first core 110_1 may write the second data information 112_2 provided to the shared memory 120 to the first storage 130_1 as the third data information 112_3 and write the second data 120_2 to the first storage 130_1 as the third data 120_3 by referring to the second data information 112_2 provided to the shared memory 120. Therefore, in the data storage system 100 according to some example embodiments, since the second data 120_2 that can be lost when the supply of external power or backup power is interrupted (or when the supplied power is less than the minimum required power) is written to the storage device 130 by the first core 110_1, data loss can be prevented.

FIGS. 9 through 10B are flowcharts and a diagram illustrating a method of detecting a write operation error of the second core 110_2 according to some example embodiments.

Referring to FIG. 9, at operation (S900), the first core 110_1 may check whether the second core 110_2 completes a write operation within a predetermined time. If the write operation has not completed by the predetermined time, it can be presumed that there an error has occurred. For example, when the predetermined time arrives, the first core 110_1 may check whether the write operation of the second core 110_2 has been completed. If at operation (S910), the second core 110_2 has already completed the write operation within the predetermined time, the first core 110_1 may determine that the second core 110_2 has no error in its write operation (operation S920). On the other hand, if at operation (S910) the second core 110_2 is still performing the write operation at the predetermined time, the first core 110_1 may determine that the second core 110_2 has a write operation error (operation S930). For example, if the second core 110_2 fails to complete the write operation within the predetermined time, it may be determined that the second core 110_2 has an error in its write operation. Through this process, the first core 110_1 can detect an error in the write operation of the second core 110_2.

Figure 10A:
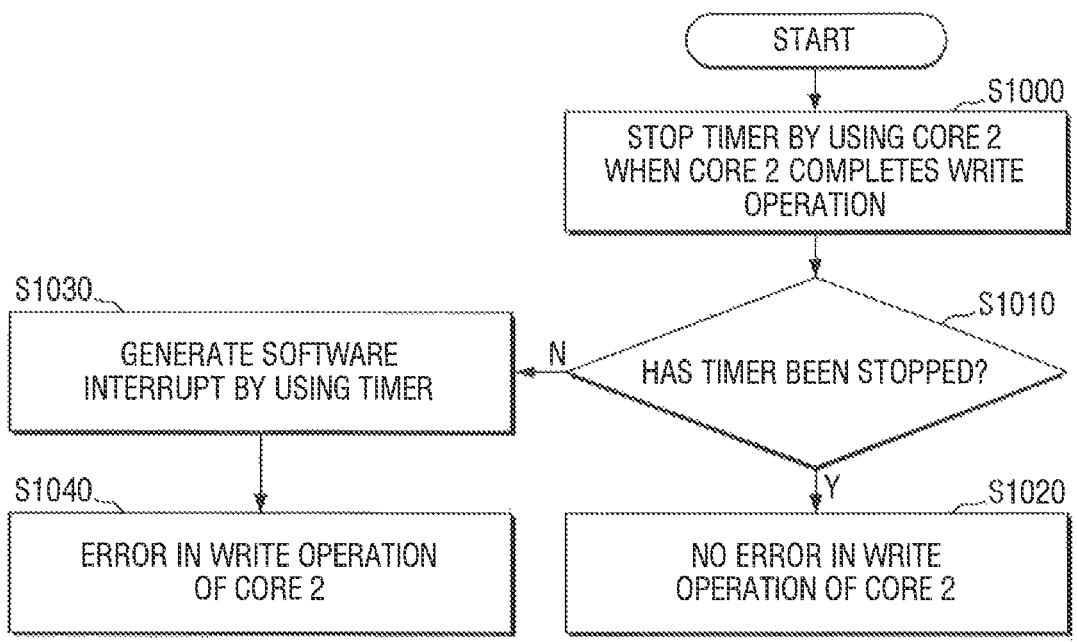

Referring to FIGS. 10A and 10B, in operation (S1000) when the second core 110_2 finishes writing the second data 120_2, it turns off a timer 1010. In other words, when the second core 110_2 writes the second data 120_2 to the second storage 130_2 normally, it stops the operation of the timer 1010. The stopped timer 1010 does not generate any signal. The first core 110_1 may not receive any signal from the second core 110_2 or the timer 1010. Therefore, at operation (S1010) there is a determination as to whether the timer has stopped. When the timer 1010 is stopped, for example, when the first core 110_1 receives no signal from the second core 110_2 or the timer 1010, then it is determined at operation (S1020) there is no error in the write operation of the second core 110_2.

If the second core 110_2 fails to complete the write operation, the timer 1010 reaches the predetermined time without being stopped. When at operation (S1010) the timer 1010 reaches the predetermined time without being turned off, the timer may generate an interrupt signal that is transmitted to the second core 110_2 (operation S1030). Then, at operation (S1040), the second core 110_2 may perform an interrupt operation in response to the interrupt signal from the timer 1010. The interrupt operation may include sending an alarm indicating an error in the write operation of the second core 110_2 to the first core 110_1. Alternatively, when the timer 1010 reaches the predetermined time without being turned off, it may send the write operation error alarm of the second core 110_2 to the first core 110_1.

When the second core 110_2 performs an interrupt operation, or when the first core 110_1 receives a write operation error alarm of the second core 110_2 from the timer 1010, the first core 110_1 may determine that there is an error in the write operation of the second core 110_2 (operation S1040) and write the second data 120_2 and the second data information 112_2 to the storage device 130. For example, when the second core 110_2 performs an interrupt operation to send a write operation error alarm of the second core 110_2 to the first core 110_1 or when the timer 1010 sends the write operation error alarm of the second core 110_2 to the first core 110_1, the first core 110_1 may write the second data 120_2 and the second data information 112_2 to the storage device 130 as the third data 120_3 and the third data information 112_3, respectively.

FIG. 10B shows a different between a normal write operation and a write operation having an error, according to one or more embodiments of the inventive concept. For example, in the normal operation time of a write operation, the timer 1010 stops at a predetermined time. However, during a write operation error, the timer 1010 sends an SOS alarm to Core 1 (e.g. an interrupt).

The method of detecting a write operation error of the second core 110_2 described above with reference to FIGS. 9 through 10B is an example, and the inventive concept is in no way limited to this example. To detect a write operation error of the second core 110_2, those of ordinary skill in the art may implement the method in firmware, software and/or hardware to execute the firmware or software, or in various ways by combining and modifying the firmware, the software and/or the hardware.

Figure 11:
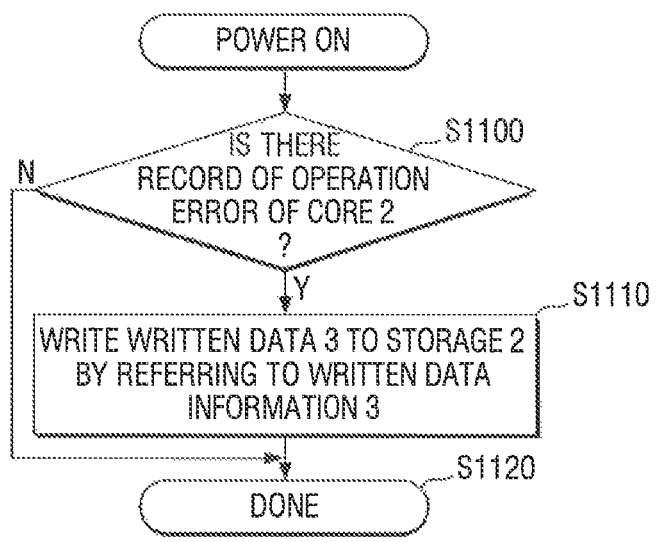
FIGS. 11 and 12 are a flowchart and a block diagram illustrating a data recovery process according to some example embodiments of the inventive concept.
Figure 12:
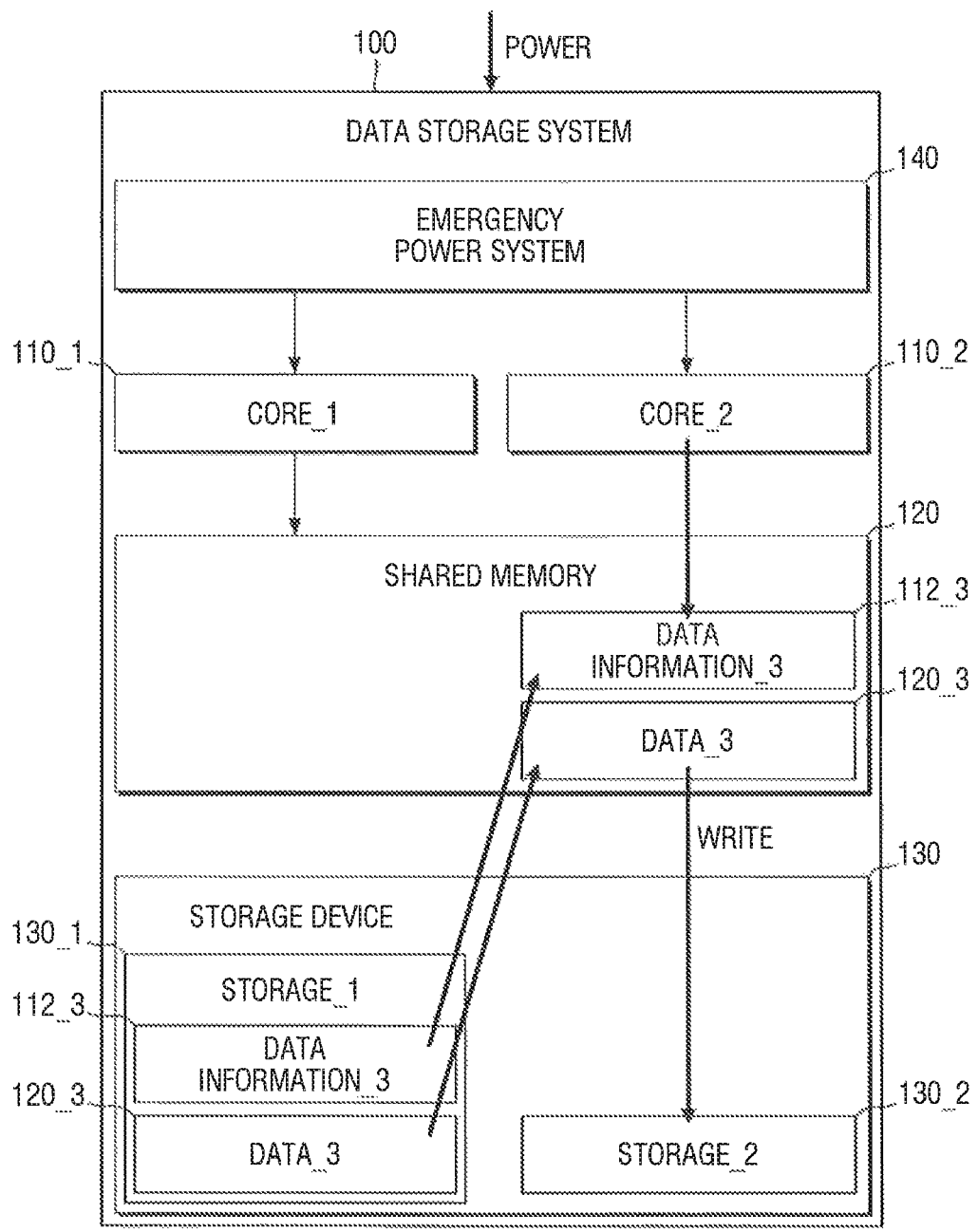

FIGS. 11 and 12 are a flowchart and a block diagram illustrating a data recovery process according to some example embodiments of the inventive concept.

Referring to FIG. 11, at operation (S1100), when external power is resupplied to the data storage system 100 according to some example embodiments at a level equal to or higher than the minimum power to drive the data storage system 100, it is determined whether there is a record of a write operation error of the second core 110_2. If at operation (S1120), there is no record of a write operation error of the second core 110_2, a recovery process may not be performed. If at operation (S1110), there is a record of a write operation error of the second core 110_2, the second core 110_2 writes the third data 120_3 to the second storage 130_2 by referring to the third data information 112_3. A data recovery method according to some example embodiments of the inventive concept will now be described in detail with reference to FIG. 12.

Referring to FIG. 12, the third data information 112_3 and third data 120_3 written to the first storage 130_1 through the processes of FIGS. 1 through 10B are illustrated. As described above, when an error in the write operation of the second core 110_2 is detected while backup power is being supplied, the first core 110_1 may write the second data information 112_2 and the second data 120_2 to the first storage 130_1 as the third data information 112_3 and the third data 120_3, respectively. In FIG. 11, the third data information 112_3 and the third data 120_3 written to the storage device 130 are illustrated as being included in the first storage 130_1. For example, the third data information 112_3 and the third data 120_3 may be written to the first storage region 132_1 of the first storage 130_1 or the first spare region 134_1 of the first storage 130_1.

For example, while external power is being supplied to the data storage system 100 at a level lower than the minimum power required to drive the data storage system 100, if a record of a write operation error of the second core 110_2 is detected, the first core 110_1 may provide the third data information 112_3 and the third data 120_3 written to the first storage region 132_1 of the first storage 130_1, or to the first spare region 134_1 of the first storage 130_1 to the buffer region 122 (see FIG. 3) of the shared memory 120 or the spare region 124 (see FIG. 3) of the shared memory 120.

Then, the second core 110_2 may write the third data 112_3 to the second storage 130_2 by referring to the third data information 112_3. Here, if the third data 112_3 includes the signature bit of the second data 112_2, the second core 110_2 may write only the second data 112_2 to the second storage 130_2.

Figure 13:
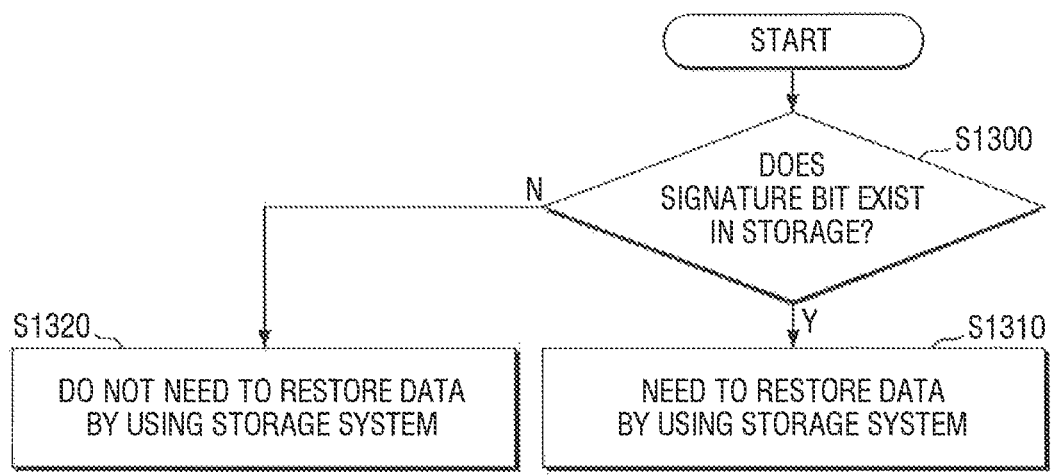
FIG. 13 is a flowchart illustrating a method of detecting a record of a write operation error according to some example embodiments of the inventive concept.

FIG. 13 is a flowchart illustrating a method of detecting a record of a write operation error according to some example embodiments of the inventive concept.

Referring to FIG. 13, when at operation (S1300), the signature bit of the second data information 112_2 and the signature bit of the second data 120_2 exist in the storage device 130, the first core 110_1 or the second core 110_2 may determine that there has been an error in the write operation of the second core 110_2. In this case, at operation (S1310) a data recovery process of the data storage system 100 according to some example embodiments is performed. On the other hand, if at operation (S1300), when the signature bit of the second data information 112_2 and signature bit of the second data 120_2 do not exist in the storage device 130, the first core 110_1 or the second core 110_2 may determine that there has been no error in the write operation of the second core 110_2. In this case, at operation (S1320), the data recovery process of the data storage system 100 according to some example embodiments may not be performed.

While the method of detecting a record of a write operation error of the second core 110_2 has been described above, it is merely an example, and the inventive concept is obviously not limited to this example. For example, those of ordinary skill in the art may implement the method of detecting a record of a write operation error in firmware, software and/or hardware, or in various ways by combining and modifying the firmware, the software and/or the hardware.

Figure 14:
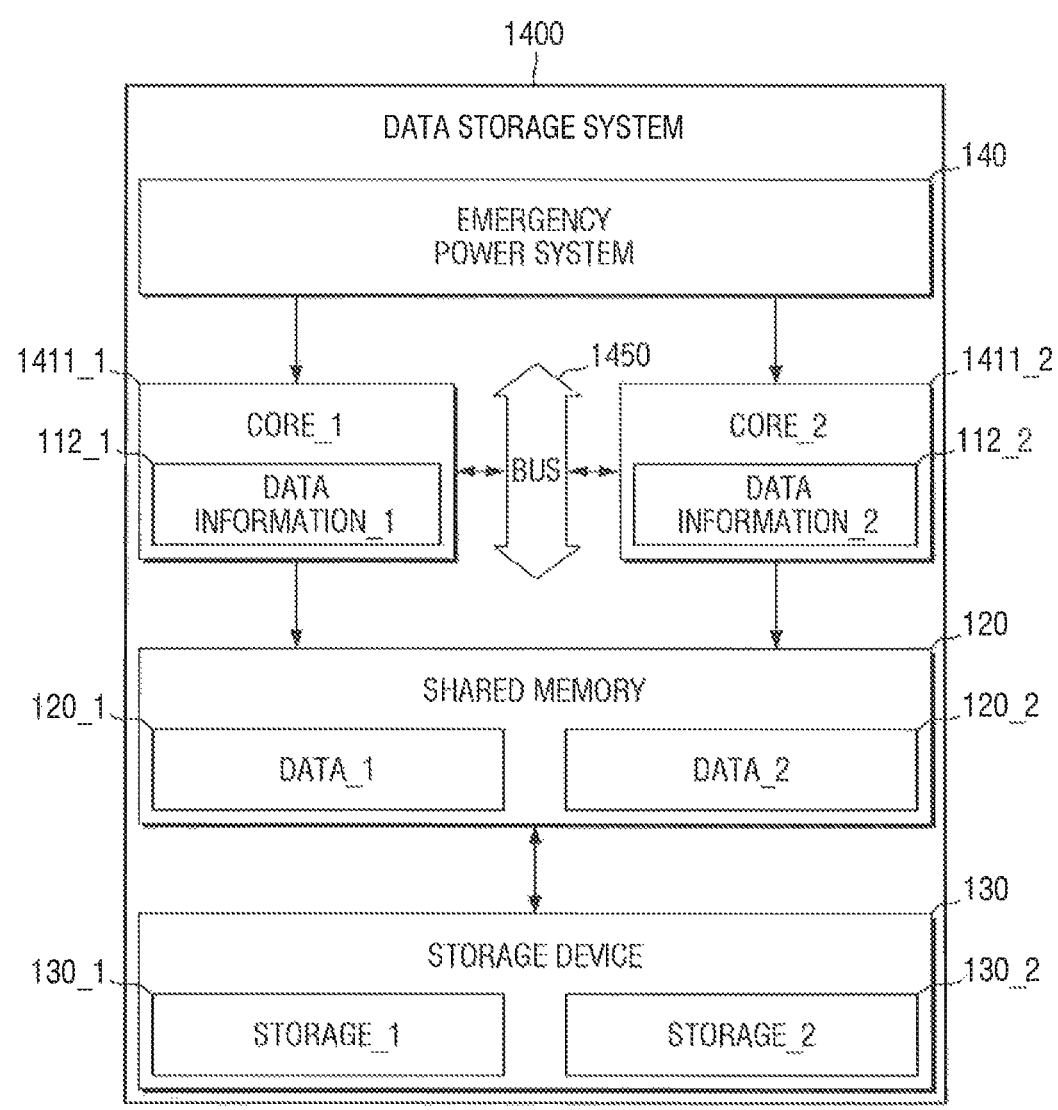
FIG. 14 is a block diagram of a data storage system according to some example embodiments of the inventive concept.

FIG. 14 is a block diagram of a data storage system 1400 according to some example embodiments of the inventive concept. In FIG. 14, components having the same or similar functions as those described above with reference to FIGS. 1 through 13 are indicated by the same reference numerals. In addition, differences from the above description will be mainly described for ease of description.

Referring to FIG. 14, the data storage system 1400 according to some example embodiments of the inventive concept may include a first core 1411_1, a second core 1411_2, a shared memory 120, a storage device 130, an emergency power system 140, and a bus 1450. Since the first core 1411_1 and the second core 1411_2 according to some example embodiments of the inventive concept are connected to each other by the bus 1450, first data information 112_1 and second data information 112_2 can be shared.

Figure 15:
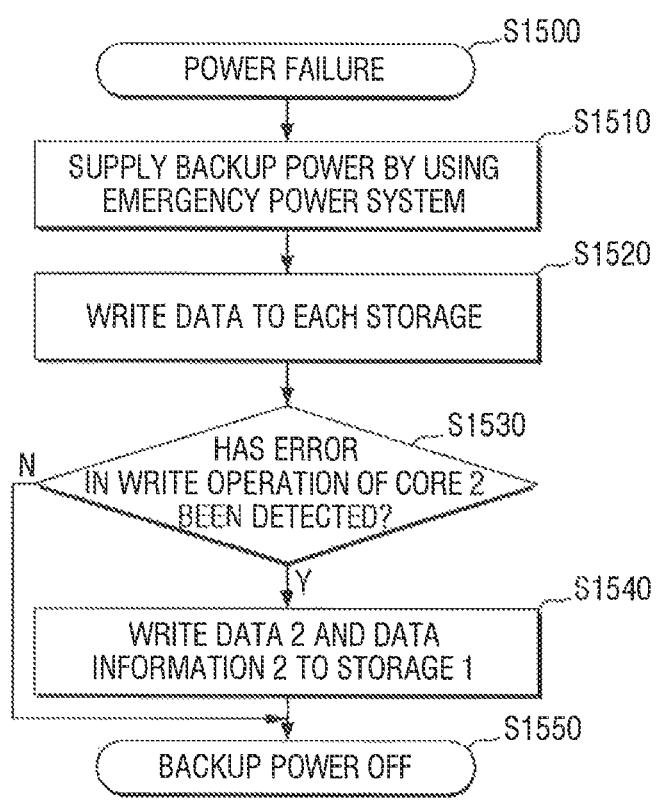
FIGS. 15 and 16 are a flowchart and a block diagram illustrating a method of writing data when a core has a write operation error in the data storage system of FIG. 14.
Figure 16:
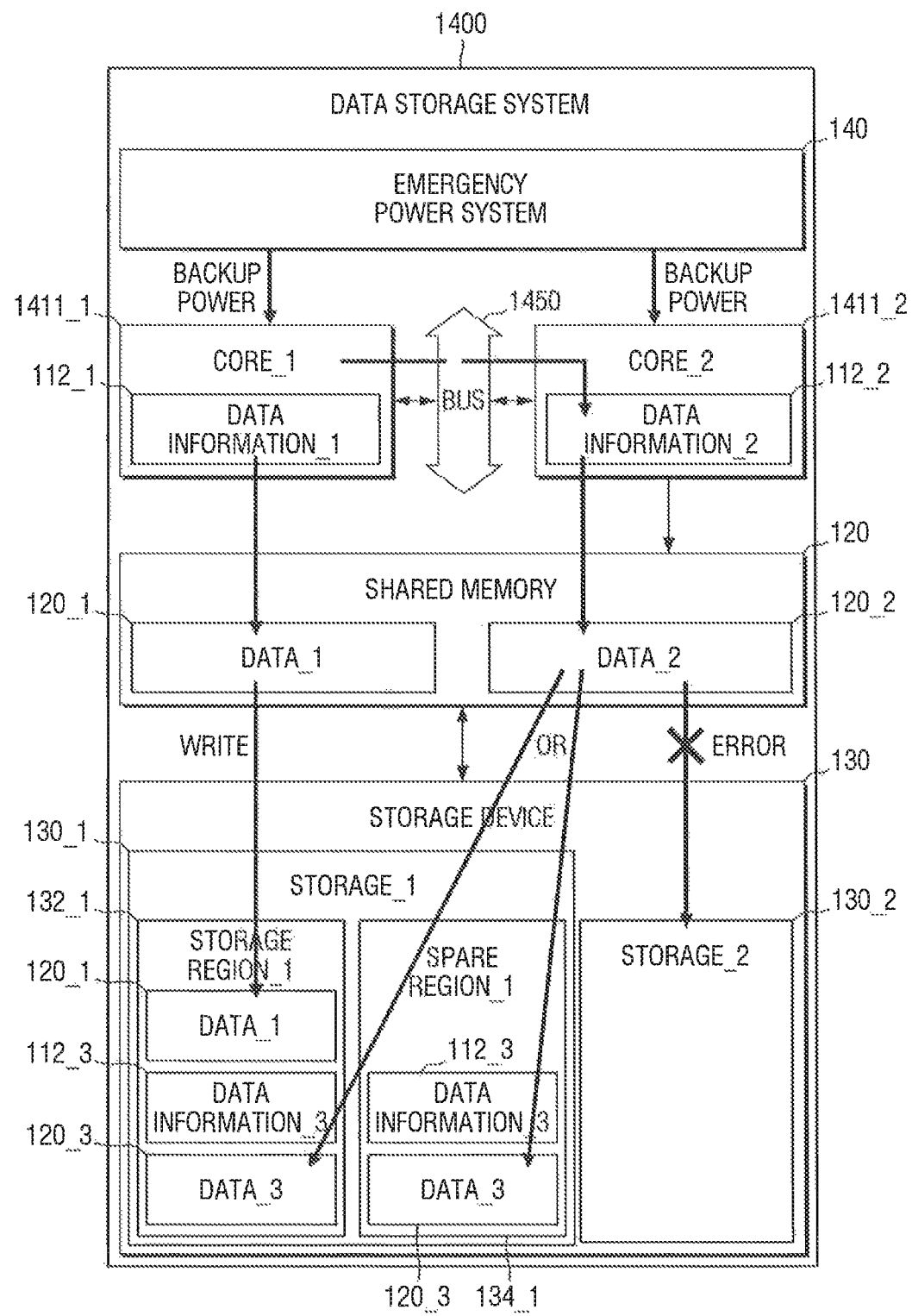

FIGS. 15 and 16 are a flowchart and a block diagram illustrating a method of writing data when a core has a write operation error in the data storage system 1400 of FIG. 14. For ease of description, differences from the above description will be mainly described.

Referring to FIG. 15, at operation (S1500) when external power supplied to the data storage system 1400 is less than the minimum power to drive the data storage system 1400 or when the supply of the external power is interrupted due to an external factor, then at operation (S1510) the emergency power system 140 of the inventive concept supplies backup power. At operation (S1520), the first core 1411_1 and the second core 1411_2 write first data 1201 and second data 120_2 to a first storage 130_1 and a second storage 130_2, respectively.

At operation (S1530), when an error in the write operation of the second core 1411_2 is detected, then at operation (S1540) the first core 1411_1 writes the second data information 112_2 and the second data 120_2 to the first storage 130_1.

For example, referring to FIG. 16, when the second core 1411_2 fails to write the second data 120_2 to the second storage 130_2, in other words, when the first core 1411_1 detects an error in the write operation of the second core 1411_2, the first core 1411_1 may directly access the second core 1411_2 and write the second data information 112_2 to the first storage 130_1 in an area of the storage designated for third data information 112_3. In addition, the first core 1411_1 may directly access the second core 1411_2 and write the second data information 112_2 and the second data 120_2 to the first storage 130_1 in areas of the storage designated for third data information 112_3 and third data 120_3, respectively.

Referring back to FIG. 15, when the first core 1411_1 finishes writing the second data information 112_2 and the second data 120_2 to the first storage 130_1, at operation (S1550) the supply of the backup power is stopped. When no error is detected in the write operation of the second core 1411_2, that is, when the first core 1411_1 and the second core 1411_2 finish writing the first data 120_1 and the second data 120_2 to the first storage 130_1 and the second storage 130_2, respectively (operation S1530), then at operation (S1550) the supply of the backup power is stopped.

Figure 17:
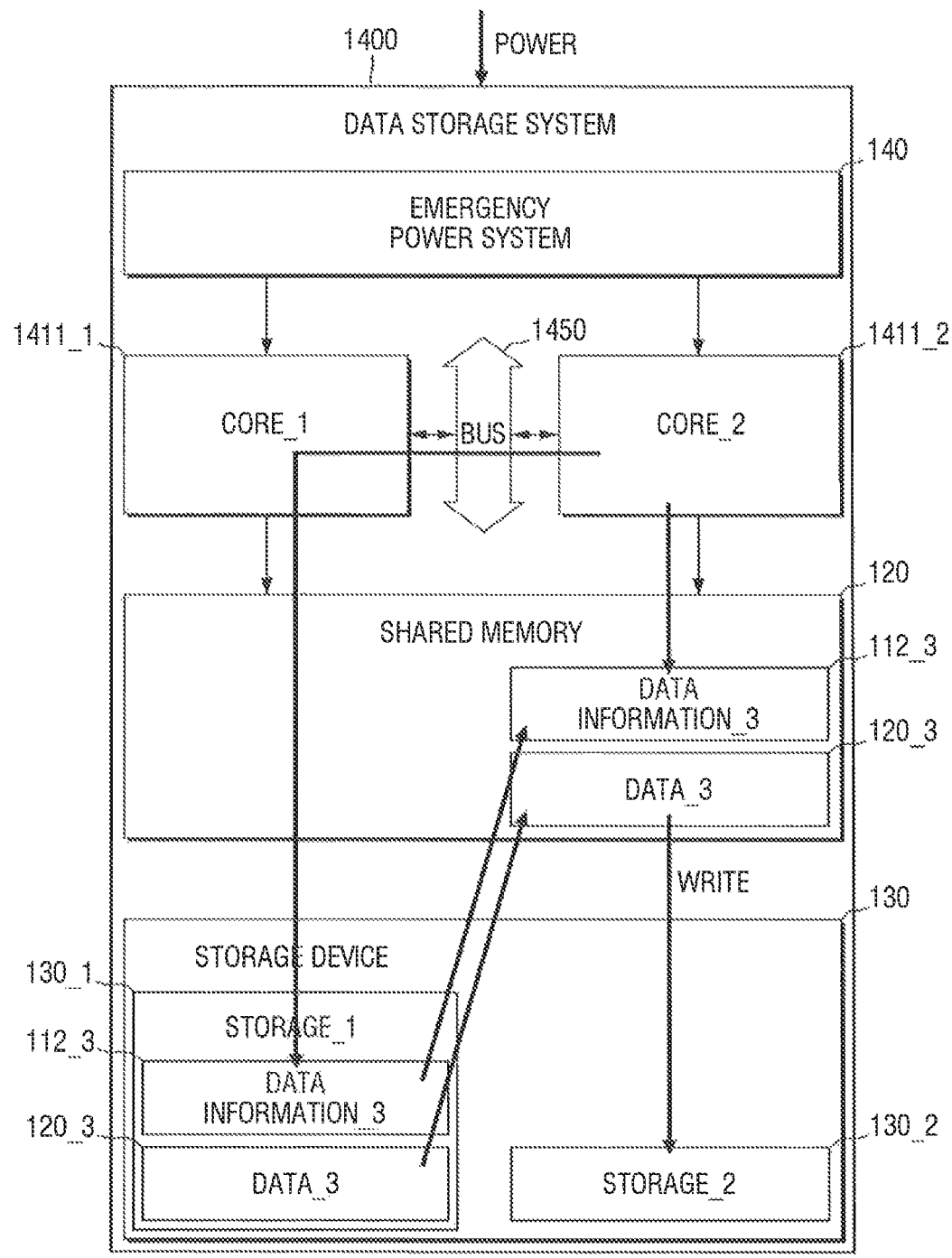
FIG. 17 is a block diagram illustrating a data recovery process according to some example embodiments of the inventive concept.

FIG. 17 is a block diagram illustrating a data recovery process according to some example embodiments of the inventive concept. For ease of description, differences from the above description will be mainly described.

While external power is being supplied to the data storage system 1400 at a level equal to or higher than the minimum power to drive the data storage system 1400, if a record of a write operation error of the second core 1411_2 is detected, the second core 1411_2 may access the first core 1411_1 through the bus 1450 and provide the third data information 112_3 and the third data 120_3 written to the first storage 130_1 to a buffer region 122 of the shared memory 120 or a spare region 124 of the shared memory 120. In the data storage system 1400 according to some example embodiments, when the second core does not perform any operation while backup power is being supplied, the first core 1411_1 may directly access the second core 1411_2 and access/reference the second data information 110_2 included in the second core 1411_2.

In the data storage system 1400 according to some example embodiments, the first core 1411_1 and the second core 1411_2 do not need to provide the first data information 112_1 and the second data information 112_2 to the shared memory 120 during the supply of the backup power. Therefore, the first core 1411_1 and the second core 1411_2 can quickly write the first data 120_1 and the second data 120_2, respectively.

In addition, in the data storage system 1400 according to some example embodiments, when an error occurs in the write operation of the second core 1411_2, only the first core 1411_1 may operate to write the second data information 112_2 and the second data 120_2 to the first storage 130_1.

In addition, in the data storage system 1400 according to some example embodiments, when there is a record of a write operation error of the second core 1411_2, only the second core 1411_2 may operate to write the third data 120_3 to the second storage 130_2.

FIG. 18 is a flowchart illustrating a method of manufacturing an SSD according to some example embodiments of the inventive concept.

Referring now to FIG. 18, first and second cores may be provided as a part of a substrate or package including one or more different semiconductor devices, and a storage device, at operation (S1800) a shared memory and a capacitor may be provided. The SSD may perform the following operations. When external power supplied to the SSD is less than the minimum power to drive the SSD, backup power stored in advance may be supplied to the first and second cores of the SSD (e.g., a data storage system) operation (S1810). The first and second cores (supplied with the backup power) may write first data and second data to a first storage 130_1 and a second storage 130_2, respectively operation (S1820). Here, if an error occurs in the write operation of the second core of the SSD, the first core may write the second data and second data information of to the first storage that is identified as third data and third data information, when the second core having the write operation error, respectively operation (S1840). On the other hand, if the first and second cores of the SSD complete their write operation without an error operation (S1830), the supply of the backup power may be stopped operation (S1850). Then, when the external power supplied to the SSD is equal to or greater than the minimum power to drive the SSD operation (S1860), it may be determined whether there is a record of a write operation error of the second core operation (S1870). If there is no record of a write operation error of the second core of the SSD, a data recovery process may not be performed. If there is a record of a write operation error of the second core of the SSD, the second core may write the written third data to the second storage by referring to the written third data information (operation S1880).

While some embodiments of the inventive concept have been described, it will be understood that various modifications can be made without departing from the scope of the present disclosure. Those of ordinary skill in the art that should readily understand that the present disclosure is not limited to any of the embodiments described herein, but rather has a coverage defined by the appended claims and their equivalents.

What is claimed is:

1. A data storage system comprising:
a storage device including a first storage and a second storage physically separated from the first storage;
two or more cores comprising at least a first core including a first data information related to a first data to be written to the first storage, and a second core including a second data information related to a second data to be written to the second storage;
a shared memory which is accessible by the first core and the second core; and
an emergency power system which in a first mode is configured to supply backup power to the first core and the second core when external power supplied to the data storage system is less than a minimum threshold operating power of the data storage system,
wherein when detection of a write operation error of the second core occurs in the first mode, the first core writes the second data information to the first storage in an area designated to store third data information, and the first core writes the second data to the first storage in the area designated to store third data by referring to a storage address of the second data information.

2. The data storage system of claim 1, wherein in the first mode, the first core provides the first data information to the shared memory, and the second core provides the second data information to the shared memory, and the first core and the second core are configured to share the first data information and the second data information through the shared memory.

3. The data storage system of claim 1, wherein the first core is configured access both the first data information and the second data information, and the second core is configured to access both the first data information and the second data information.

4. The data storage system of claim 1, wherein the third data information comprises the second data information and a first signature bit related to the second data information, and the third data comprises the second data and a second signature bit related to the second data, wherein the first signature bit and the second signature bit are utilized for data recovery.

5. The data storage system of claim 4, wherein the first core writes the third data information to a storage region of the first storage and writes the third data to the storage region of the first storage by referring to storage information included in the second data information.

6. The data storage system of claim 4, wherein the first core writes the third data information to a spare region of the first storage and writes the third data to a storage region of the first storage by referring to storage information included in the second data information.

7. The data storage system of claim 1, wherein the detection of the write operation error of the second core in the first mode comprises:
  detection of the write operation error of the second core based on an interrupt signal generated by a timer, when the second core fails to turn off the timer before a predetermined time.

8. The data storage system of claim 1, wherein the detection of the write operation error of the second core in the first mode comprises:
  check, at a predetermined time, whether the second core has the write operation error by operation of the first core, wherein the first core determines that the second core has the write operation error when the second core has not completed performance of a write operation at the predetermined time.

9. The data storage system of claim 1, wherein the first data information comprises a first validity information related to the first data, a first shared memory address related to the first data, a first storage address related to the first data and information about a type of the first data, and the second data information comprises a second validity information related to the second data, a second shared memory address related to the second data, a second storage address related to the second data and information about the type of the second data.

10. The data storage system of claim 1, wherein when the second core in a second mode detects that a record of a write operation error of the second core, and in which the external power supplied to the data storage system is equal to or greater than the minimum threshold operating power of the data storage system, the first core writes the third data to the second storage by referring to storage information included in the second data information.

11. A data storage system comprising:
  a storage device comprising a first storage and a second storage physically separated from the first storage;
  a plurality of cores including a first core having first data information related to a first data to be written to the first storage, and a second core having a second data information related to a second data to be written to the second storage; and
  a shared memory which is accessible by the first core and the second core,
  wherein when a record of a write operation error of the second core is detected, the second core writes a third data, which is different from the first data and has been written to the first storage, to the second storage by referring to a third data information that has been written to the first storage, and wherein the third data information is different from the first data information.

12. The data storage system of claim 11, further comprising an emergency power system which is configured to supply backup power to the first core and the second core in a first mode in which external power supplied to the data storage system is less than a minimum threshold operating power of the data storage system, wherein when a write operation error of the second core is detected in the first mode, the first core writes the second data to the first storage in an area designated to store the third data by referring to the second data information and writes the second data information to the first storage in the area designated to store the third data information.

13. The data storage system of claim 11, wherein the record of the write operation error of the second core is detected based on a check of whether a signature bit of the third data related to the second core and a signature bit of the third data information related to the second core exist in the first storage.

14. The data storage system of claim 13, wherein a signature bit that exists in a spare region of the first storage comprises the signature bit of the third data information, and a signature bit exists in a storage region of the first storage comprises the signature bit of the third data.

15. The data storage system of claim 11, wherein when the record of the write operation error of the second core is detected, the first core provides the third data information and the third data to the shared memory, or the second core provides the third data information and the third data to the shared memory.

16. The data storage system of claim 11, wherein the third data information comprises validity information related to the third data, a shared memory address related to the third data, a storage address related to the third data, and information about a type of the third data.

17. A data storage method comprising:
  supplying a pre-stored backup power to a first core and a second core in a first mode in which external power supplied to a data storage system is less than a minimum threshold operating power of the data storage system;
  accessing a shared memory by the first core and the second core;
  writing, by the first core, a first data stored in the shared memory to a first storage included in a storage device by referring to a first storage address of first data information included in the first core in which the first data information comprises information related to the first data; and
  writing, by the second core, a second data stored in the shared memory to a second storage included in the storage device and different from the first storage by referring to a second storage address of second data information included in the second core, and
  in response to detecting a write operation error of the second core, writing, by the first core, the second data information to the first storage in an area designated to store a third data information and writing the second data to the first storage in the area designated to store a third data by referring to a storage address of the second data information.

18. The data storage method of claim 17, further comprising writing, by the second core, the third data to the second storage by referring to the storage address of the third data information when a record of a write operation error of the second core is detected in a second mode in which the external power supplied to the data storage system is equal to or greater than the minimum threshold operating power of the data storage system.

19. The data storage method of claim 17, further comprising, in the first mode, providing, by the first core, the first data information to the shared memory, and providing, by the second core, the second data information to the shared memory by the second core, wherein when the write operation error of the second core is detected, the first core accesses the shared memory, writes the second data information provided to the shared memory to the first storage in the area designated to store the third data information, and writes the second data to the first storage in the area designated to store the third data by referring to storage address of the second data information provided to the shared memory.

20. The data storage method of claim 17, wherein the write operation error of the second core is detected in the first mode, the first core accesses the second core, writes the second data information to the first storage in the area designated to store the third data information, and writes the second data to the first storage in the area designated to store the third data by referring to the second data information.

* * * * *